Figure 1:
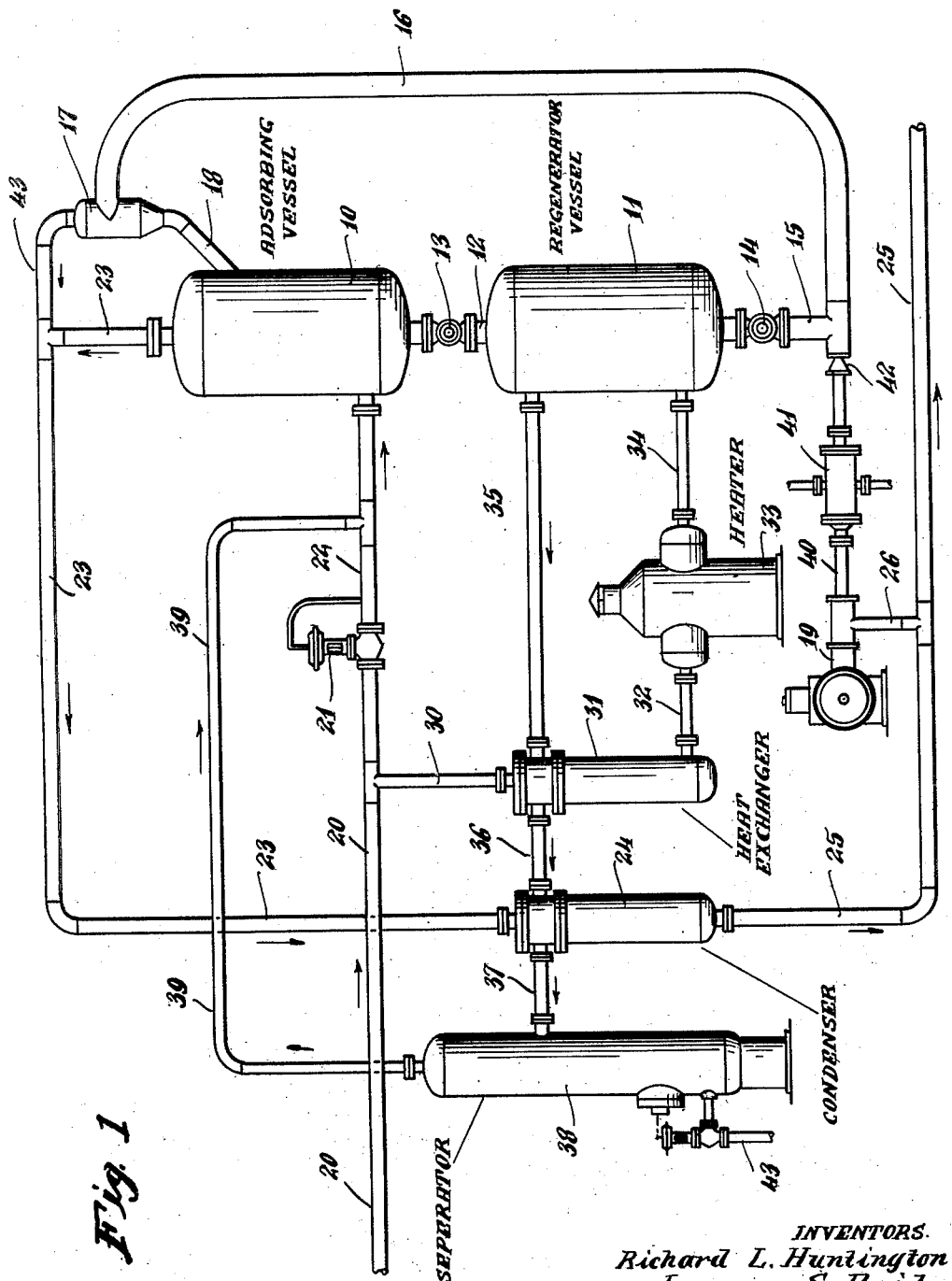

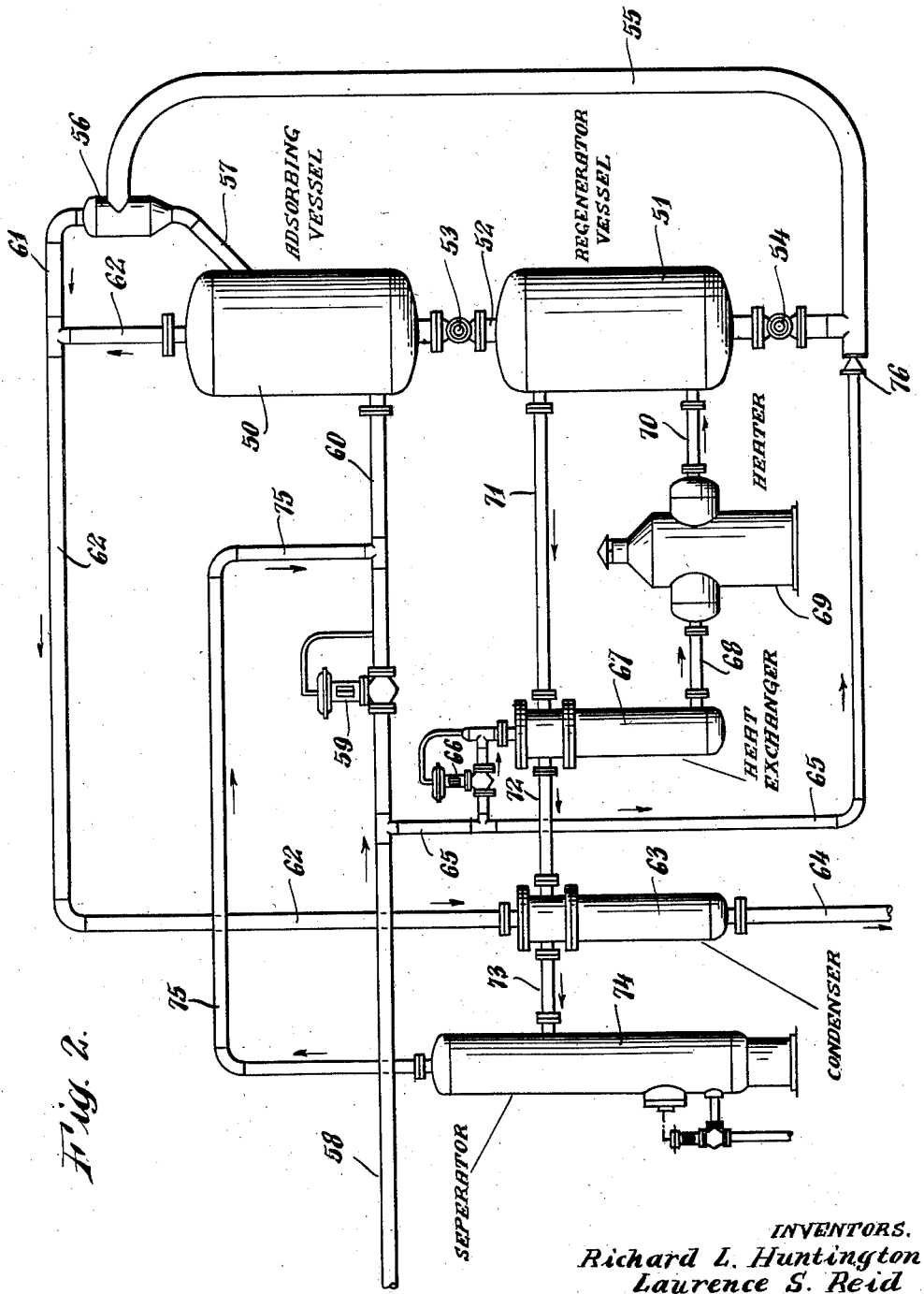

UNITED STATES PATENT OFFICE 2,642,955

GAS SEPARATION BY ADSORPTION

Richard L. Huntington and Laurance S. Reid, Norman, Okla., assignors to Aluminum Company of America, Pittsburgh, Pa., a corporation of Pennsylvania Application June 25, 1947, Serial No. 756,866

11 Claims. (Cl. 183—114.2)

This invention is directed primarily to continuous processes for the dehydration of natural gas but is useful in the processing of any gas or fluid containing adsorbable, liquefiable components the separation of which is desired. The processes of the invention are of that type which utilize as adsorbing medium a solid substance such as alumina, silica gel, carbon or similar compound or substance having adsorbing powers, when activated, and responding to reactivation or regeneration to the extent that such powers are at least partially restored when lost, in whole or in part, by reason of saturation of the adsorbent with adsorbable substances.

An object of this invention is to provide a continuous process in which a high degree of adsorption efficiency may be obtained at relatively low cost. A further object is to provide continuous gas treating processes operable at high pressures and in which the gas to be treated and the absorptive solids are so handled as to permit use of relatively small amounts of adsorption material and relatively small and efficient adsorption and regenerative vessels.

Another object is the provision of dehydration processes in which heat losses are maintained at a minimum. A still further object of the invention is the provision of processes of gas treatment which are operable in apparatus having a minimum of moving parts. Other objects of the invention include provision of continuous gas handling methods operable with a minimum consumption of fuel, continuous gas purification methods in which heat balances are largely maintained by manipulation of the gas under treatment, and other and similar objects which will be apparent from the following description of the embodiment of the invention.

The processes embodying the invention will be described with reference to the drawings, in which Fig. 1 depicts in schematic form a preferred treatment circuit assembled from known devices; and Fig. 2 shows, in similar fashion, an alternative circuit.

Since the processes of this invention may be practiced without resort to highly specialized mechanism, it being possible and desirable to construct the treatment circuit from known instrumentalities, no details of the various parts of the apparatus are shown.

In carrying out the methods of the invention, any suitable closed adsorbing vessel of sufficient height to insure contact between gas passing therethrough and particles of solid adsorbent disposed therein, may be used. In conjunction therewith is also used a regenerator vessel in which the particles of solid adsorbent are treated to remove such material as may have been adsorbed in the adsorbing vessel and thus restore or reactivate the adsorbent. In the apparatus shown in Figure 1 the adsorbing vessel 10 is connected to the regenerator vessel 11 by the pipe 12 in which is disposed a barrel valve 13, or an equivalent valve such as a star valve, which will permit particles of solid adsorbent to be transferred downwardly from the adsorbing zone defined by the vessel 10 to the regenerative zone defined by the vessel 11 without permitting the simultaneous passage of substantial amounts of gas upwardly from vessel 11 to vessel 10. During the dehydration process the movement of the adsorbent particles is substantially continuous in the circuit defined by the adsorbing vessel 10, the pipe 12, the regenerative vessel 11, the valve 14 (similar to valve 13 just described), the removal pipe 15, the gas lift 16, the separator 17, and the feed pipes 18.

Raw gas to be purified is drawn from a pressured source thereof, the source pressure being such as to insure the unaided travel of the gas throughout the treatment circuit except as later noted. The raw gas enters the system in pipe 20 and the major portion thereof travels through the pressure reducing valve 21. At a point upstream of said valve 21 a minor portion of the raw gas is diverted from pipe 20 and enters the reactivation or regeneration circuit through pipe 30. The major portion of the raw gas, after passing pressure reducing valve 21, enters pipe 22 through which it flows to the adsorbing zone, entering adsorbing vessel 10 at the bottom of that zone and passing upwardly therethrough. The thus dehydrated gas flows from the adsorbing zone and then through pipe 23 into condenser 24 where the dehydrated gas is used as a coolant for gas flowing in the regeneration circuit, and thence through exit pipe 25 to storage or for use. At a point in the passage of the dehydrated gas from the adsorbing zone to eventual storage or use, a quantity thereof is bled off or removed for use in the gas lift 16. In the circuit illustrated this quantity of gas is bled off from pipe 25 through pipe 26 and thence to compressor 19 where the gas is compressed and then fed through pipe 40 to the gas lift 16. After leaving compressor 19, the compressed gas may, if desired, be passed through a gas cooler 41 and expansion nozzle 42, before flowing to the lift device.

The minor portion of raw gas, which is divided from the entering stream of pressure supplied raw gas, travels through pipe 30 to heat exchanger 31 and then through pipe 32 to the heater 33 (which may be of any convenient type) where its temperature is finally raised sufficiently to furnish the needed heat to regenerate the solid adsorbent which is disposed in the regeneration vessel 11. From heater 33 the gas flows through pipe 34 into the bottom of the regenerative zone. Thence it passes upwardly through the regenerative vessel 11 and leaves that vessel at a point near the upper extremity thereof where it flows through pipe 35 and heat exchanger 31, where it exchanges a portion of its heat to gas entering the regenerative circuit through pipe 30. From heat exchanger 31 the gas now flows through pipe 36 to condenser 24 where under the cooling action of dehydrated gas delivered to the condenser by pipe 23, the liquefiable components, originally adsorbed in the dehydration operation and yielded to the regenerative gas in the regeneration zone, are in large part condensed. The mixture of gas and liquid thus formed by this condensing operation flows from condenser 24 through pipe 37 to separator 38 where the liquid phase is separated, collected and drained through the liquid outlet 43. The gas passing from separator 38 flows through pipe 39, thus leaving the regeneration circuit and being delivered to pipe 22 at a point downstream of pressure valve 21 where it joins the major portion of the raw gas as that major portion moves to the adsorbing zone.

During the gas movements just described the particles of solid adsorbent are continuously circulating through their defined path. Entering the adsorbing zone through pipe 18, the adsorbent progresses downwardly through that zone in vessel 10. The adsorbent leaves vessel 10 through valve 13 and pipe 12 and progresses downwardly through the regeneration zone defined by vessel 11, finally passing from vessel 11 downwardly through valve 14 and pipe 15 into the lower part of the gas lift 15 where, meeting the stream of gas from nozzle 42, the adsorbent particles are lifted to a point above the adsorbing zone where they are separated in chamber 17, the adsorbent particles passing through pipe 18 into the adsorbing zone, where they again pass through the cycle of movement just described. It will be noted that once the sorbent particles have been delivered at the top of the adsorption zone, their progression downwardly through the adsorbing vessel 10 and then through the regenerator 11 is by gravity. Thus throughout the adsorbing process the sorbent particles form a bed of more or less continuous mass thus eliminating, to large extent, undesirable suspension of the sorbent particles in the gas under treatment. The lift gas after passing through separator 17 rejoins the stream of processed gas by passing through pipe 43 into pipe 23. It will be noted that this lift gas could be returned to the system by being passed into the top of vessel 10.

As is well known, regeneration of solid adsorbents requires relatively high temperatures, whereas the regenerated adsorbent functions most efficiently at relatively low temperatures. It is therefore necessary that efficient cooling of the regenerated adsorbent take place prior to the time that the regenerated solid adsorbent is contacted by the raw gas which enters the adsorbing zone. It is a feature of the process of this invention that such cooling is effected without the use of separate cooling chambers or devices and, for the most part, without application of coolants other than the gas moving through the various circuits above described. Specifically the invention contemplates a primary cooling of the regenerated adsorbent by compressed gas delivered from the adsorbing zone during the period in which that processed gas is used to transfer the adsorbent particles from the regeneration zone to the adsorbing zone. This primary cooling is followed by a secondary cooling in the upper portion of the adsorbing zone where the adsorbent particles flowing into the upper portion of that zone are there contacted with processed or treated gas which results from the raw gas contacting adsorbent disposed in the lower portion of the adsorbing zone. It will be noted in this connection that the raw gas is fed to the lower portion of the adsorbing zone where it conveniently contacts adsorbent and that thereafter it moves upwardly countercurrent to the progression of the mass of adsorbent particles downwardly through said zone. Therefore, by the time the rising gas reaches the upper portion of the adsorbing zone and exerts the secondary cooling effect upon the reactivated adsorbent particles which are entering that zone, the gas will have been substantially processed or dehydrated. The cooling thus accomplished is efficient and effective, but yet does not require cooling chambers or physical movement of the adsorbent to an extent greater than that required by the transfer of the regenerated adsorbent from the bottom of the regenerating zone to the lower portion of the adsorbing zone. In the circuit illustrated it will be noted that the amount of primary cooling effected in the gas lift 16 will vary to some extent with the length of that lift and the period of contact between the compressed gas fed from compressor 19 and the adsorbent particles. Therefore, within limits, the dimensions of the gas lift may be adjusted to obtain the desired cooling effect. However, to avoid bleeding an excessive amount of processed gas to the compressor 19 to insure complete cooling in the lifting step of the adsorbent transfer operation, the adsorbing zone may be so dimensioned as to provide a period of contact between the relatively cool processed gas flowing through the upper part of that zone, countercurrent to the adsorbent moving downwardly in the upper part of that zone, thus completing the required cooling in the upper portion of the adsorbing zone prior to the time the downwardly progressing adsorbent particles contact raw, untreated gas. It is an added advantage of these cooling steps that the cooling is effected by processed, or substantially processed, gas thereby avoiding material use of the adsorbing power of the adsorbent prior to its contact with raw gas. The cooler 41 and expansion nozzle 42 may be provided, the cooler to accentuate the cooling effect and the nozzle to insure positive lift of the regenerated particles, but these, if desired, may be dispensed with and the gas fed directly to the lift 16 from pipe 40.

With the exception of a limited quantity of dehydrated gas which is compressed for use in the gas lift 15 as described, all movement throughout the process of gas and adsorbent treatment is caused by the original pressure on the raw gas which enters the system. This is effectively accomplished by dividing the minor quantity of raw gas which is to be used in the regeneration of the adsorbent at a point prior to that point where the pressure of the major raw gas portion is reduced, and by finally feeding the gas from the regeneration circuit into the dehydrating circuit at a low pressure point. It will also be observed that the compressor 19 and the valves 13 and 14 represent the only moving mechanisms necessary to the practice of the process and that leakage in either of these moving mechanisms will affect but slightly the total pressure relations essential to the flow of the gas through the dehydrating and regenerating circuits. Valve 14 is not necessary but is desirable to insure a steady regulated flow of regenerated particles to the gas stream.

A further advantage of the process of this invention lies in efficient utilization of waste heat carried by the gas flowing from the regeneration step to supply a portion of the heat required by the gas flowing into the regeneration step, the exchange of heat for this purpose likewise serving to reduce the temperature of the laden gas moving from the regeneration zone, so that the cooling effect of processed gas flowing from the adsorption zone will be usually sufficient to condense a large part of the liquefiable components of the laden gas, thus allowing ready separation thereof before the gas flows from the regenerative circuit to join the row gas flowing to the adsorbing zone.

The alternate circuit illustrated in Figure 2 has many of the advantages of the circuit just described but is designed for use where the original raw gas pressure is high and where an effluent of higher moisture content may be tolerated as an end product. The system shown includes an adsorber 50 and regenerator chamber 51 connected by pipe 52 in which is located a barrel valve 53. Sorbent material from the regenerator 51 flows by gravity through barrel valve 54 to the gas lift 55 from which the sorbent passes into separator 56 and thence through duct 57 into the adsorber 50 (the lift gas being returned to the processed gas circuit through pipe 61). In every respect the flow and cooling of the particles of sorbent are as specifically described in connection with the circuit shown in Figure 1. Raw gas is fed into adsorber 50 through intake pipe 58, pressure reducing valve 59 and pipe 60. From adsorber 50 the treated gas passes through pipe 62 and condenser 63 to outlet pipe 64 from which it flows to use or storage, all as described with reference to the circuit shown in Fig. 1. To furnish regeneration fluid a portion of raw gas bled off from inlet pipe 58 through pipe 65 is passed through pressure reducing valve 66, heat exchanger 67, pipe 68, heater 69 and pipe 70 to the regenerator 51 and thence through pipe 71, heat exchanger 67, pipe 72, condenser 63, pipe 73, separator 74 and pipe 75 to pipe 60, all in the manner and for the purpose set forth with respect to the equivalent regeneration circuit shown in Fig. 1. In contradistinction to the circuit shown in Fig. 1, the gas used in the circuit of Fig. 2 to convey the sorbent particles through the gas lift 55, the chamber 56 and into the adsorber is not taken from the supply of treated gas and thereafter compressed but is, instead, taken from the source of raw gas and, without compression, fed directly into the gas lift 55. Thus a portion of the gas bled from pipe 58 through pipe 65 is diverted, in the circuit shown in Fig. 2, directly into the gas lift 55 through, preferably but not necessarily, expanding nozzle 76.

The advantage of the circuit of Fig. 2 just described lies in the complete elimination of any compressor device thus limiting the moving parts of the circuit solely to the necessary valves. The disadvantage of the circuit of Fig. 2 lies in the dilution of the treated gas issuing from the adsorber and some contamination of adsorbing particles where at the end of their passage through gas lift 55 their temperature is reduced to such extent as to allow some effective adsorbing action. Otherwise the circuit of Fig. 2 has the advantages above described with reference to the circuit of Fig. 1.

Having thus described our invention, we claim:

1. In a cyclic method for removing an adsorbable component from gas containing the same, the combination of steps comprising dividing raw gas from a pressured source thereof into a major portion and a minor portion, reducing the pressure of said major portion and then flowing the same into a relatively cool adsorbing zone countercurrent to the progression of a substantially continuous mass of sorbent particles moving through and from said zone toward and into a hotter regenerative zone, passing the major portion of gas from the top of the adsorbing zone as treated gas, removing from the thus treated gas a quantity thereof prior to delivery of the treated gas, compressing said removed quantity, conducting a flow of said compressed quantity to the adsorbing zone, feeding regenerated sorbent particles from said regenerative zone into the flow of said compressed gas to effect delivery of said particles to the adsorbing zone, separating the regenerated particles from the flow of compressed gas, delivering said particles to the adsorbing zone and conducting the compressed gas into the stream of treated gas, heating the said minor portion of the raw gas, passing said heated minor portion into contact with sorbent particles in the regenerative zone, conducting a flow of all of said minor gas portion out of said regenerative zone, condensing liquefiable elements from said minor gas portion, separating said liquefiable elements, flowing the thus stripped minor gas portion into the adsorbing zone.

2. The process of claim 1 characterized by the fact that at least a portion of the heat applied to the minor portion of the raw gas prior to its entry into said regenerative zone is transferred thereto from gas flowing from said regenerative zone.

3. The process of claim 1 characterized by the fact that the temperature of the compressed quantity of gas is adjusted to effect cooling of the sorbent particles carried thereby from the regenerative zone to the adsorbing zone.

4. The process of claim 1, characterized by the fact that the compressed quantity of gas is expanded to effect cooling of the sorbent particles carried thereby from the regenerative zone to the adsorbing zone.

5. The process of claim 1 characterized by the fact that the temperature of the compressed quantity of gas is cooled to effect cooling of the sorbent particles carried thereby from the regenerative zone to the adsorbing zone.

6. The process of claim 1 characterized by the fact that the compressed quantity of gas is expanded and cooled to effect cooling of the sorbent particles carried thereby from the regenerative zone to the adsorbing zone.

7. In a cyclic method for removing an adsorbable component from gas containing the same, the combination of steps comprising dividing raw gas from a pressured source thereof into a major portion and a minor portion, reducing the pressure of said major portion and then flowing the same into a relatively cool adsorbing zone countercurrent to the progression of a substantially continuous mass of sorbent particles moving through and from said zone toward and into a hotter regenerative zone, passing the major portion of gas from the top of the adsorbing zone as treated gas, heating the said minor portion of the raw gas, passing said heated portion into contact with sorbent particles in the regenerative zone, passing all of said heated minor gas portion out of said regenerative zone, condensing liquefiable elements from said minor gas portion, separating said liquefiable elements, flowing the thus stripped minor gas portion into the adsorbing zone, bleeding a third gas portion from the gas in the system, conducting a flow of said third portion under pressure to the adsorbing zone, feeding regenerated sorbent particles from said regenerative zone into the flow of said third portion to effect delivery of said particles to the adsorbing zone, and separating the regenerated particles from the flow of gas under pressure delivering said particles to the adsorbing zone and conducting the gas into the stream of treated gas.

8. In a cyclic method for removing adsorbable component from gas containing the same, the combination of steps comprising dividing raw gas from a pressured source thereof into a major portion and two minor portions, reducing the pressure of said major portion and then flowing the same into a relatively cool adsorbing zone countercurrent to the progression of a mass of sorbent particles moving through and from said zone toward and into a hotter regenerative zone, conducting a flow of one of said minor portions of raw gas toward the adsorbing zone at the top thereof, feeding regenerated sorbent particles from said regenerative zone into the flow of said minor raw gas portion to effect delivery of said particles to the adsorbent zone, heating the other of said minor portions of raw gas, passing said heated raw gas portion into contact with sorbent particles in the regenerative zone and thereafter flowing all of said heated portion from said regenerative zone, condensing liquefiable elements from said portion, separating said liquefiable elements, flowing the thus stripped portion into the adsorbing zone.

9. The process of claim 8 characterized by the fact that a portion of the heat applied to the gas portion flowing into the regenerative zone is transferred thereto from gas flowing from said regenerative zone.

10. In a cyclic method for removing adsorbable component from gas containing the same, the combination of steps comprising dividing raw gas from a pressured source thereof into a major portion and a minor portion, reducing the pressure of said major portion and then flowing the same into a relatively cool adsorbing zone countercurrent to the progression of a mass of sorbent particles moving through and from said zone toward and into a hotter regenerative zone, heating the minor portion of the raw gas, passing said heated portion into contact with sorbent particles in the regenerative zone, flowing all of said minor gas portion out of said regenerative zone, condensing liquefiable elements from said minor gas portion, separating said liquefiable elements, flowing the thus stripped minor gas portion into the adsorbing zone, separating another portion of said raw gas from said pressured source, separately conducting a flow of said other portion toward the adsorbing zone, feeding regenerated sorbent particles from said regenerative zone into the flow of said other separated portion to effect delivery of said particles to the adsorbing zone.

11. The process of claim 10 characterized by the fact that a portion of the heat applied to the portion of the raw gas supplied to the regenerative zone prior to its entry into said zone is transferred thereto from gas flowing from said regenerative zone.

RICHARD L. HUNTINGTON.
LAURANCE S. REID.

References Cited in the file of this patent

UNITED STATES PATENTS

| Number | Name | Date |
|---|---|---|
| 1,422,007 | Soddy | July 4, 1922 |
| 1,577,534 | Miller | Mar. 23, 1926 |
| 1,825,707 | Wagner, Jr. | Oct. 6, 1931 |
| 1,836,301 | Bechthold | Dec. 15, 1931 |
| 1,948,779 | Abbott et al. | Feb. 27, 1934 |
| 2,495,842 | Gilliland | Jan. 31, 1950 |
| 2,507,608 | Miller | May 16, 1950 |

FOREIGN PATENTS

| Number | Country | Date |
|---|---|---|
| 317,629 | Great Britain | Aug. 22, 1929 |